United States Patent [19]

DeAngelis et al.

[11] Patent Number: 5,337,383
[45] Date of Patent: Aug. 9, 1994

[54] METHOD FOR INTERNAL LASER WELDING OF METALLIZED OPTICAL COMPONENTS FOR ATTACHMENT OF OPTICAL FIBERS

[75] Inventors: Mario E. DeAngelis, New Brunswick; Douglas Troast, Pompton Plains; Patrick Calella, Newton, all of N.J.

[73] Assignee: The United States of America as represented by the Secretary of the Army, Washington, D.C.

[21] Appl. No.: 149,448

[22] Filed: Nov. 9, 1993

[51] Int. Cl.5 .............................. G02B 6/30
[52] U.S. Cl. ............................. 385/49; 359/900; 385/14; 385/51; 385/147
[58] Field of Search ............... 228/123.1, 124.1; 219/121.6, 121.61, 121.63, 121.64; 385/14, 15, 39, 49, 51, 52, 88, 89, 90, 91, 129, 130, 131, 132, 147; 359/900

[56] References Cited

U.S. PATENT DOCUMENTS 5,107,535  4/1992  Hakogi .................. 385/49
5,146,522  9/1992  Pavlath ................. 385/49
5,267,336 11/1994  Sriram et al. .......... 385/129

FOREIGN PATENT DOCUMENTS 2184255  6/1987  United Kingdom ........ 385/49

*Primary Examiner*—Rodney B. Bovernick
*Assistant Examiner*—John Ngo
*Attorney, Agent, or Firm*—Anthony T. Lane; Edward Goldberg; Michael C. Sachs

[57] ABSTRACT

A method for internal laser welding of metallized optical components for the attachment of optical fibers which comprises the steps of: milling a "V" groove in one end face of a fiber carrier; aligning an optical fiber in the "V" groove; polishing end faces of an integrated optics chip and the fiber carrier assembly; depositing chromium layers on integrated optics chip and the fiber carrier assembly; depositing eutectic alloy on chromium layers; optically aligning the optical fiber and a wave guide in the integrated optics chip; and applying a pulse laser beam for an internal laser weld between the end face of the integrated optics chip and the end face of the fiber carrier assembly.

12 Claims, 2 Drawing Sheets

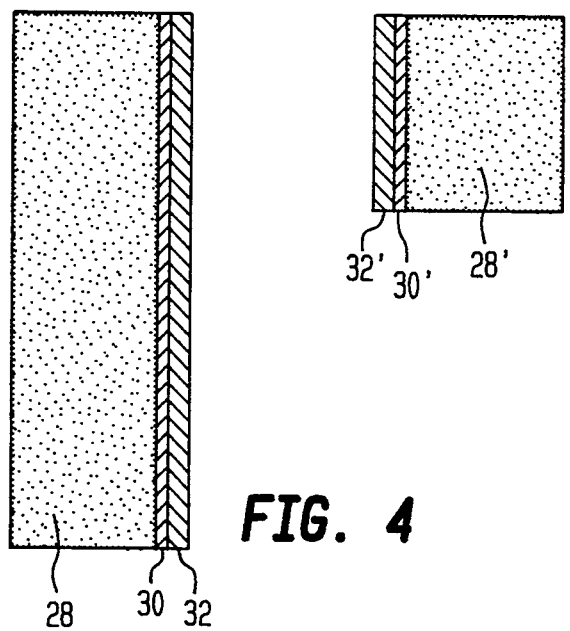
FIG. 5
FIG. 4
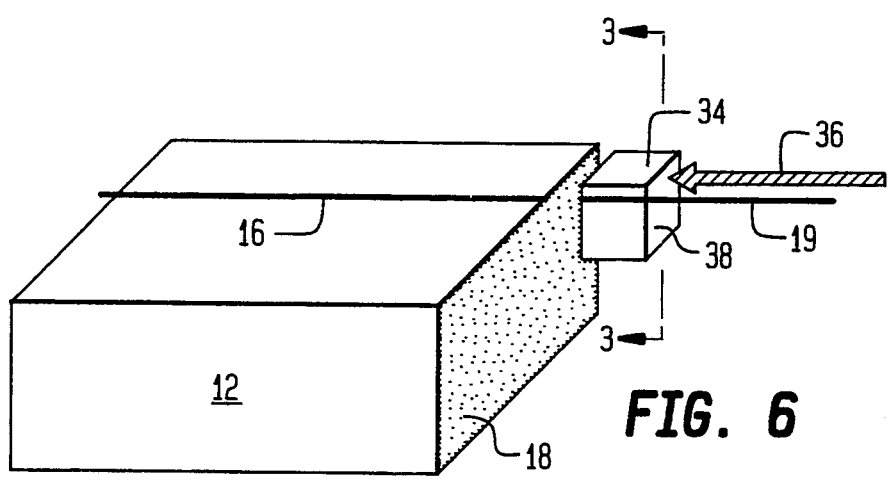
FIG. 6
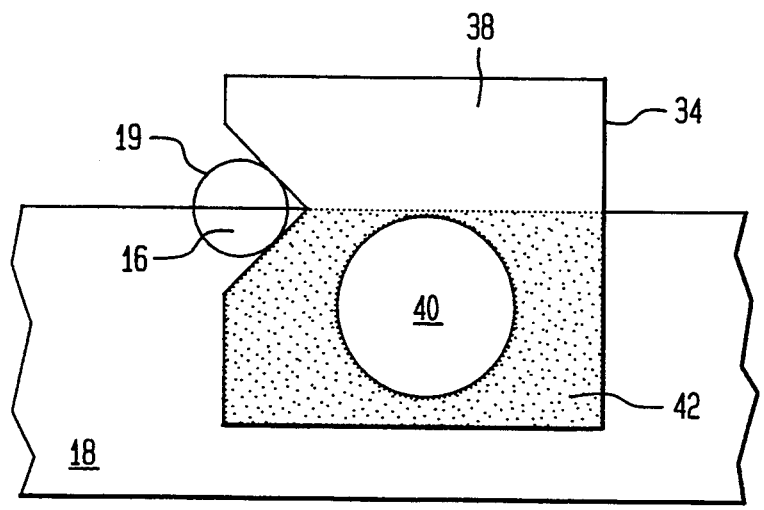
FIG. 7

METHOD FOR INTERNAL LASER WELDING OF METALLIZED OPTICAL COMPONENTS FOR ATTACHMENT OF OPTICAL FIBERS

GOVERNMENTAL INTEREST

The invention described herein may be manufactured, used and licensed by or for the United States Government.

BACKGROUND OF THE INVENTION

In recent years the military services have developed "smart" munitions which utilize optical communication systems and optical sensors frequently which must be electrically connected or optically aligned to an optical fiber for the transmission of light. These "smart" munitions are being used in increasingly demanding environments. These munitions are frequently used in applications which require them to survive 20,000 G's plus, at temperatures which can range from $-45°$ to $+71°$ C. and have shelf life of up to 20 years.

In the past optical epoxies have been used as a means of attaching optical fibers to other optical components such as laser diodes, photo detectors and Integrated Optic Chips (IOC's). Recently the IOC's made of LiNbO$_3$ have been improved to the degree to be combined with optical fiber into complete systems. The optical fiber is usually supported by a cube-shaped element called a fiber carrier which is typically made of the same material as the IOC. The optical fiber is positioned in a V-groove in the fiber carrier. After the fiber is correctly positioned into this V-groove, a small drop of optical epoxy is applied to the length of the V-groove and cured with ultra-violet light. Once optical alignment is made between the optical fiber/fiber carrier assembly and the IOC, a small drop of optical epoxy is applied to one face of the components. The two components are then brought back into contact and optical alignment, spreading the epoxy between them. UV light is then used to cure the epoxied assembly for approximately four (4) minutes. After this initial cure, the complete assembly is baked at 50° C. for several hours.

The problem with this prior art method is that the epoxy material creeps if a force is applied to a bonded component for a period of time. The is only a small amount of empirical data with regard to lifetime and environmental survivability under the military conditions aforementioned. There displacement of epoxied components would allow optically aligned waveguides to separate. If this misalignment is perpendicular to the optical axis, a movement as small as 0.1 $\mu$m would result in significant attenuation of the light signal. Present epoxies that are curable by UV light have another problem. They exhibit an abrupt change in their Coefficient of Thermal Expansion in the temperature region of $-35°$ to $+12°$ C. Since the military temperature range varies from $-45°$ to $+71°$ C., cycling of epoxy bonded components cause greater likelihood of bond failure, decreased signal to noise ratio or even spurious signals as a cold munition is heated during cannon launched applications. Another problem with epoxied optical components is their relatively long curing time. The aforementioned problem coupled with the difficulty of applying an epoxy accurately and without excess, seriously limits high volume production and drives up cost.

SUMMARY OF THE INVENTION

The present invention relates to an improved method of internal laser welding of metallized optical components.

An object of the present invention is to provide a reliable method for attaching an optical fiber to another optical component, such as an Integrated Optics Chip, or a laser diode through the use of a laser to produce an internal spot weld.

Another object of the present invention is to provide an improved method for making optical interconnects by using metal-to-metal spot welding techniques.

Another object of the present invention is to provide an improved method for joining optical components more quickly, which are stronger, and are readily producible.

Another object of the present invention is to provide a method where optical components are optically aligned and can be internally fusion welded to give a strong permanent bond in the short time it takes to pulse a laser welder.

Another object of the present invention is to provide a method for connecting optical components by means of a single internal weld compared to an external line weld which requires two separate, oppositely opposed welds made simultaneously minimize lifting or tilting of the component.

Another object of the present invention is to provide a method of joining optical components which reduces optical misalignment due to epoxy joint creep.

Another object of the present invention is to provide a method of joining optical components together to have at least 20 year shelf life.

A further object of the present invention is to provide a method for joining optical components together which will exhibit less misalignment than epoxied joints when placed in an environment with temperature fluctuations.

For a better understanding of the present invention, together with other and further objects thereof, reference is made to the following descriptions taken in connection with the accompanying drawings.

BRIEF DESCRIPTION OF THE DRAWINGS

FIG. 4 is a cross-sectional view of layers of metal on a section of Lithium Niobate (LiNbO$_3$) IOC wafer taken along line 1—1 of FIG. 2.

FIG. 5 is a cross-sectional view of layers of metal on a LiNbO$_3$ fiber carrier taken along line 2—2 of FIG. 3.

FIG. 6 is a schematic isometric view showing the orientation of the fiber optic carrier assembly and the Integrated Optics Chip for making a laser weld. FIG. 7 is a partial expanded view of the optical fiber/fiber carrier assembly taken along line 3—3 of FIG. 6.

Throughout the following description like reference numerals are used to denote like parts of the drawings.

DETAILED DESCRIPTION OF THE PREFERRED EMBODIMENTS

Figure 1:
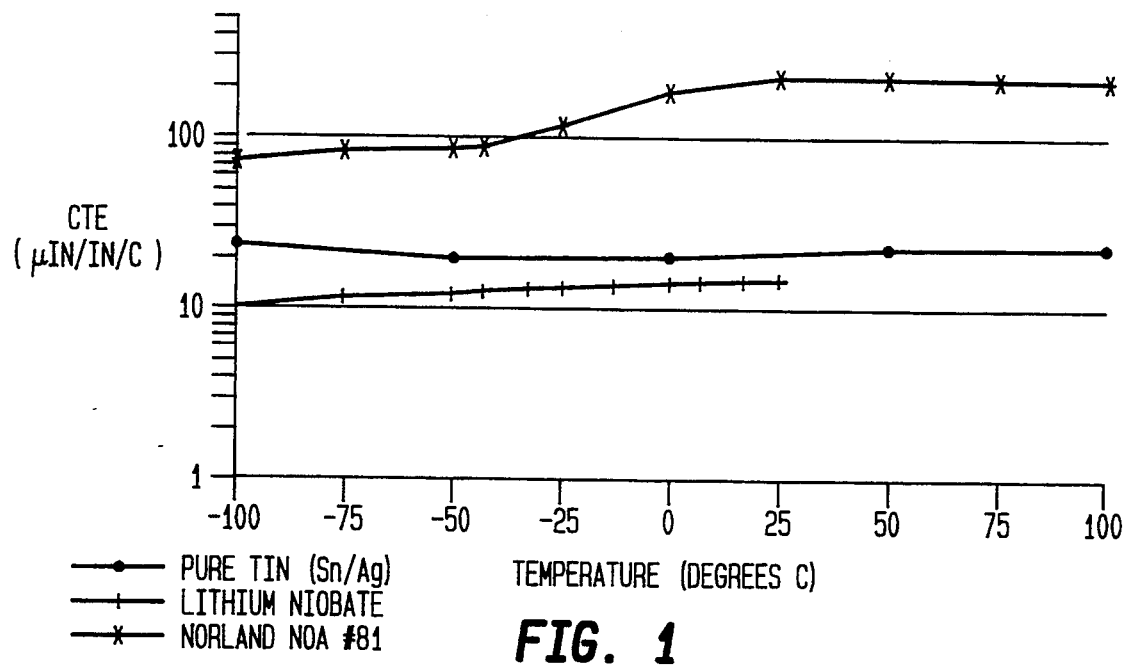
FIG. 1 is a plot of Coefficient of Thermal Expansion (CTE) versus Temperature for a 96.5% Tin, 3.5% Silver eutectic alloy, for Lithium Niobate, and for a Norland NOA #81 epoxy.

Referring now to FIG. 1 plots were rode of the Coefficient of Thermal Expansion of prior art optical epoxy material, lithium niobate and an entectic tin silver alloy. The abrupt change in the CTE for the epoxy material, in the temperature region −35° to +12° C., can be clearly seen. Epoxy is not used in the present invention for connecting a fiber carrier assembly to an IOC in the present invention because of bond failures heretofore described.

FIG. 1 shows that Sn/Ag is better thermally matched to LiNbO3 than the epoxy.

Figure 2:
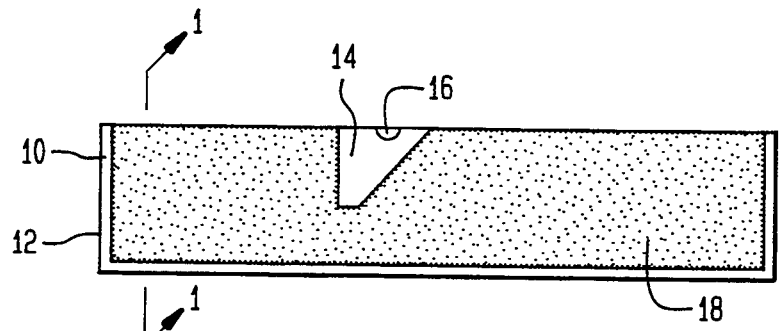
FIG. 2 is an end face planar view of a metallized Integrated Optics Chip (IOC) and an IOC waveguide.

Referring now to FIG. 2, end face 10 of a LiNbO3 IOC 12 is polished to have an optical finish thereon. The IOC end face 10 is masked in area 14 to protect a titanium infused waveguide 16 from being metallically coated with metal film 18.

Figure 3:
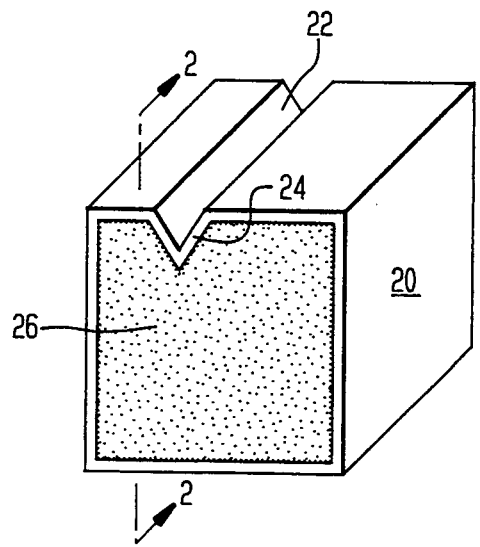
FIG. 3 an isometric view of a fiber carrier with a metallized end face.

Referring now to FIG. 3, cube shaped LiNbO3 fiber carrier 20 has an optical fiber positioning groove 22 milled therein. End face 24 is polished to have an optical finish on its surface. End face surface 24 has a metallically coating 26 thereon identical with the IOC metal coating 18. An optical fiber 19 is fixedly held in fiber carrier groove 2—2 by means of an epoxy cement applied to the length of V groove 22 and cured with ultraviolet light. The positioned optical fiber 19 is shown in FIGS. 6 and 7.

The cross-sectional drawing of the IOC of FIGS. 4 and 5 each show a LiNbO3 substrate 28 and 28' respectively. A very thin chromium layer 30 and 30', about 200 Angtrom, is deposited on the LiNbO3 substrates 28, 28', respectively, by vacuum evaporation deposition techniques well known in the art of manufacturing solid-state electronics and will not be described herein. The material used for laser welding of the IOC 12 to the fiber carrier 20 is an eutectic alloy, Tin and Silver (96.5% Tin, 3.5% Silver by weight). The Tin/Silver layer ranging in thickness from 0.25 to 0.5 μm, 32 and 32' of FIGS. 4 and 5, respectively is deposited on top of the chromium layers 30, 30'. The intermediate chromium base metal layer 30, 30' were chosen because of its excellent adhesion properties and lower thermal diffusivity for slower heat conduction.

Referring now to FIGS. 6 and 7, the next step consists of bringing the two metallized faces 18 and 26 of the IOC 12 and fiber carrier assembly (OF/FC) 34 into contact and optical alignment with each other. The next step consists of directing a focused laser beam 36 from a Neodymium doped, Yittrium-Aluminum-Garnet (Nd:YAG) laser, not shown, having a beam wavelength of 1.06 μm, through the back end 38 of the fiber carrier assembly 34. Since the LiNbO3 fiber carrier is an optically transparent material, the laser light 36 heats the metallized face 26 of the FC assembly 34, and by conduction, causes the metallized face of the IOC 18 to also heat up to the point that both metallizations will melt and fuze together producing an internal spot weld indicated by the circular area 40 in the overlap metallized area 42.

This method of attaching an optical fiber to another optical component requires only the amount of time necessary to pulse the laser after the two pieces are optically aligned. This method of welding is easily adapted to an automated, high production environment, producing high strength bonds without creep, thermal instabilities, and with good stability over long shelf life.

Tin and Silver eutectic alloy and chromium metals were selected for this process because they have low reflectivities (and in the case of the Tin and Silver euteticalloy, a low melting temperature of 220° C.) as when compared to other metals typically used for welding (i.e., Gold and Copper).

Selecting a Nd:YAG laser with a wavelength of 1.06 μm is important because at this wavelength LiNbO3 fiber carrier 20 is very transmissive. This property is necessary to allow the laser beam 36 to pass through the back end 38 of the FC assembly 34 to heat and effect a weld between the two optically aligned components.

While a specific embodiment of the invention has been shown and described in detail to illustrate the application of the principles of the invention, it will be understood that the invention may be embodied otherwise without departing from such.

What is claimed is:

1. A method for internal laser welding of metallized optical components for the attachment of optical fibers which comprises the steps of:

milling a "V" groove in one face of a fiber carrier;
  aligning an optical fiber in said "V" groove;
  epoxying said optical fiber to fixedly hold said fiber in said "V" groove;
  polishing an end face of an integrated optics chip;
  infusing a titanium wave guide on a surface of an integrated optical chip;
  polishing an end face of fiber carrier assembly;
  masking said end face of said integrated optics chip,
  depositing a first chromium layer on said end face of said integrated optics chip;
  masking an end face of said fiber carrier assembly to avoid coating said optic fiber;
  depositing a second chromium layer on said end face of said fiber carrier assembly;
  depositing a first eutectic alloy on top of said first chromium layer of said integrated optics chip;
  depositing a second eutectic alloy on top of said second chromium layer of said fiber carrier assembly;
  positioning said end faces of said integrated optics chip and said fiber carrier assembly so they are in contact with each other and that said optical fiber and said wave guide are in optical alignment; and
  applying a pulsed laser focused beam output of a Neodymium doped Yittrium-Aluminum-Garnet laser through a back end of said optically aligned fiber carrier assembly to effect an internal laser weld between said metallized end of said integrated optics chip and said end face of said fiber carrier assembly.

2. A method for internal laser welding as recited in claim 1 wherein the step of depositing a first chromium layer on said end face of said integrated optics chip includes depositing a chromium layer about 100 Angstrom thick.

3. A method for internal laser welding as recited in claim 2 wherein the step of depositing a first chromium layer on said end face of said fiber carrier assembly includes depositing of a chromium layer about 100 Angstrom thick.

4. A method for internal laser welding as recited in claim 3 wherein the steps of depositing a first chromium layer includes the step of vacuum depositing a layer 100 Angstrom thick on said end face of said integrated optics chips.

5. A method for internal laser welding as recited in claim 4 wherein the step of depositing a first chromium layer includes the step of vacuum depositing a layer 100 Angstrom thick on said end face of said fiber carrier assembly.

6. A method for internal laser welding as recited in claim 5 wherein the step of depositing a first eutectic alloy on top of said first chromium layer of said integrated optics chip includes the step of depositing a first eutectic alloy of Tin and Silver 96.5% Tin, 3.5% Silver by weight.

7. A method for internal laser welding as recited in claim 6 wherein the step of depositing a 96.5% Tin, 3.5% Silver by weight includes the step of depositing a eutectic alloy ranging from 0.25 to 0.5 $\mu$m thick.

8. A method for internal laser welding as recited in claim 7 wherein the step of depositing a second eutectic alloy on top of said second chromium layer of said fiber carrier assembly includes the step of depositing a first eutectic alloy of Tin/Silver, 96.5% Tin, 3.5% Silver by weight.

9. A method for internal laser welding as recited in claim 8 wherein the step of depositing a 96.5% Tin, 3.5% Silver by weight includes the step of depositing an eutectic alloy ranging from 0.25 to 0.5 $\mu$thick.

10. A method for internal laser welding as recited in claim 9 wherein the step of polishing said end face of an integrated optics chip includes the step of polishing an end face of a lithium niobate integrated optics chip.

11. A method for internal laser welding as recited in claim 10 wherein the step of polishing said end face of said optical fiber/fiber carrier assembly includes the step of polishing an end face of a lithium niobate fiber carrier assembly.

12. A method for internal laser welding as recited in claim 11 wherein the step of applying a pulsed laser focused beam output includes the step of applying a pulsed laser focused beam output having a 1.06 $\mu$m wavelength.

* * * * *